United States Patent
Cernea

(10) Patent No.: US 7,135,910 B2
(45) Date of Patent: *Nov. 14, 2006

(54) CHARGE PUMP WITH FIBONACCI NUMBER MULTIPLICATION

(75) Inventor: Raul-Adrian Cernea, Santa Clara, CA (US)

(73) Assignee: SanDisk Corporation, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/069,660

(22) Filed: Feb. 28, 2005

(65) Prior Publication Data

US 2005/0168267 A1     Aug. 4, 2005

Related U.S. Application Data

(63) Continuation of application No. 10/260,115, filed on Sep. 27, 2002, now Pat. No. 6,861,894.

(51) Int. Cl.
    *G05F 3/02*     (2006.01)
(52) U.S. Cl. ........................................ 327/536; 363/60
(58) Field of Classification Search ................ 327/536, 327/537; 307/110; 363/60
    See application file for complete search history.

(56) References Cited

U.S. PATENT DOCUMENTS

| | | | | |
|---|---|---|---|---|
| 3,824,447 A * | 7/1974 | Kuwabara | .................... | 363/60 |
| 5,051,881 A * | 9/1991 | Herold | ........................ | 363/60 |
| 5,397,931 A * | 3/1995 | Bayer | ......................... | 327/306 |
| 5,436,587 A | 7/1995 | Cernea | ....................... | 327/536 |
| 5,491,623 A * | 2/1996 | Jansen | ........................ | 363/60 |
| 5,508,971 A | 4/1996 | Cernea et al. | ........ | 365/189.09 |
| 5,596,532 A | 1/1997 | Cernea et al. | ........ | 365/189.07 |
| 5,606,491 A * | 2/1997 | Ellis | .............................. | 363/60 |
| 5,801,577 A * | 9/1998 | Tailliet | ...................... | 327/536 |
| 5,856,918 A * | 1/1999 | Soneda et al. | ................ | 363/60 |
| 5,870,295 A * | 2/1999 | Watanabe | .................... | 363/60 |
| 6,466,489 B1 | 10/2002 | Ieong et al. | ........... | 365/189.09 |
| 6,556,064 B1 * | 4/2003 | Yatabe | ....................... | 327/536 |

FOREIGN PATENT DOCUMENTS

| | | |
|---|---|---|
| JP | 2001 339938 | 7/2001 |
| JP | 2001339938 | 8/2002 |
| NL | 9300836 | 12/1994 |

OTHER PUBLICATIONS

"Notification of International Search Report or the Declaration", corresponding PCT application No. PCT/US03/29503, International Searching Authority, European Patent Office, Feb. 25, 2004, 7 pages.

*IEEE 100 The Authoritative Dictionary of IEEE Standards Terms (Seventh Edition)*, Standards Information Network IEEE Press, Dec., 2000, p. 427.

\* cited by examiner

*Primary Examiner*—Terry D. Cunningham
(74) *Attorney, Agent, or Firm*—Parsons Hsue & de Runtz LLP

(57) ABSTRACT

A charge pump includes a plurality of capacitors that are alternately charged and serially coupled. When serially coupled, the voltage across a given capacitor will equal the voltage at its negative terminal and the voltage across the preceding capacitor.

5 Claims, 5 Drawing Sheets

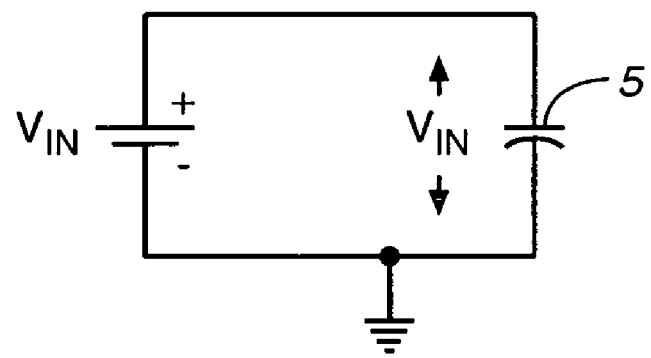
Charging half cycle
FIG._1A
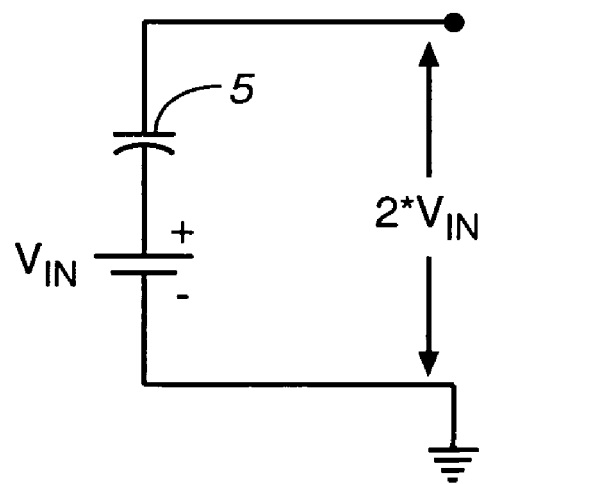
Transfer half cycle
FIG._1B

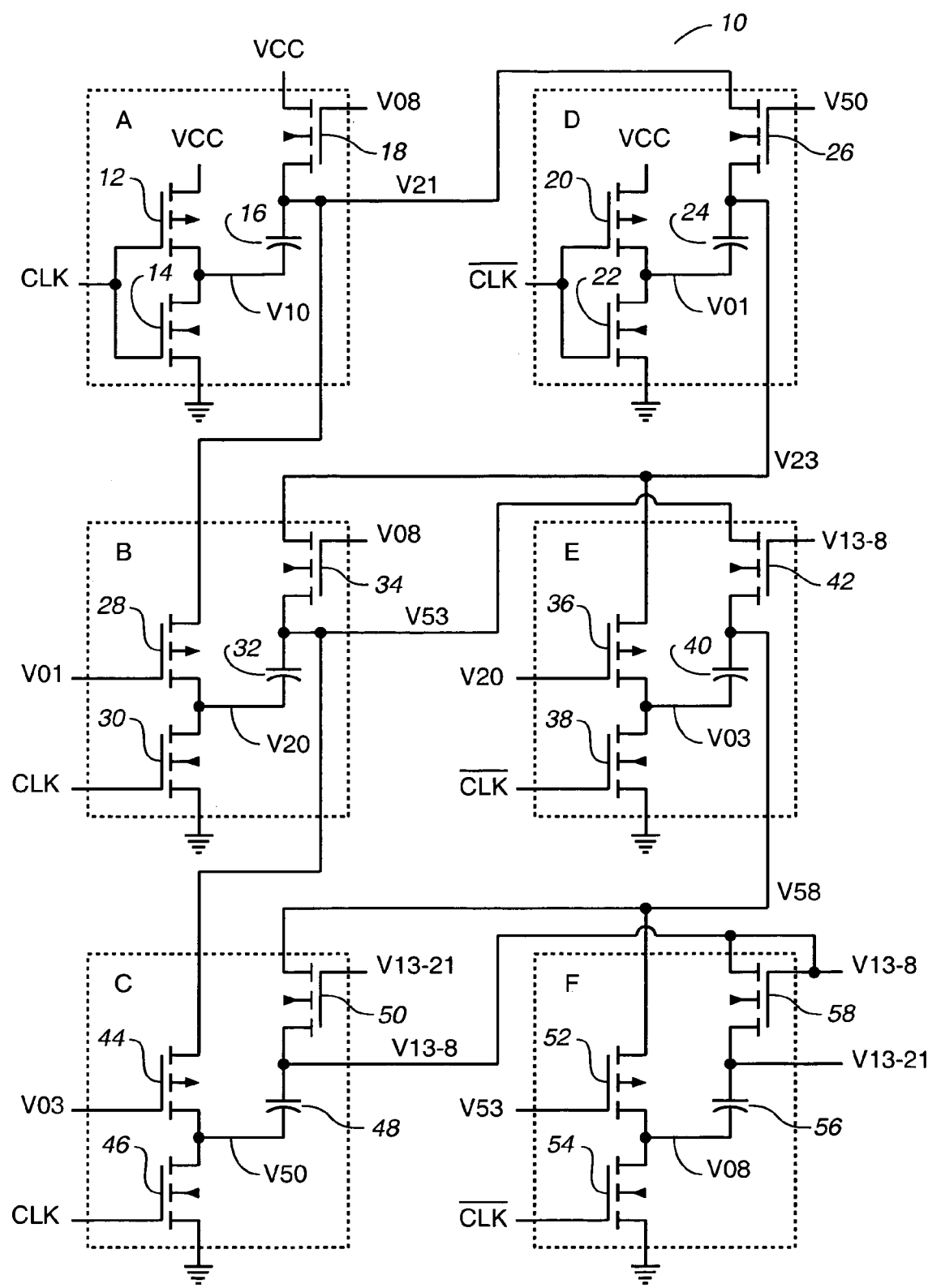
FIG._2

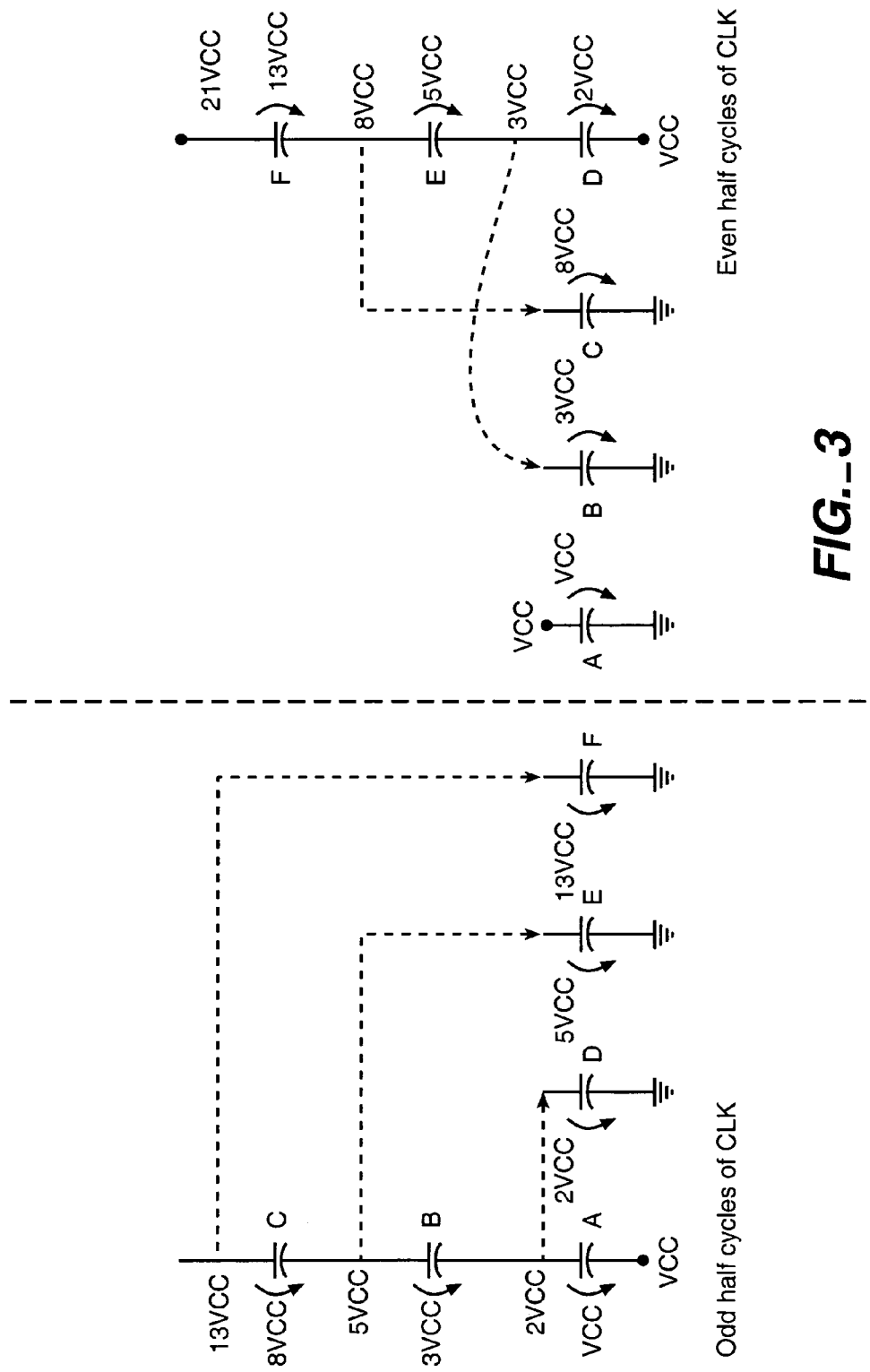
FIG._3

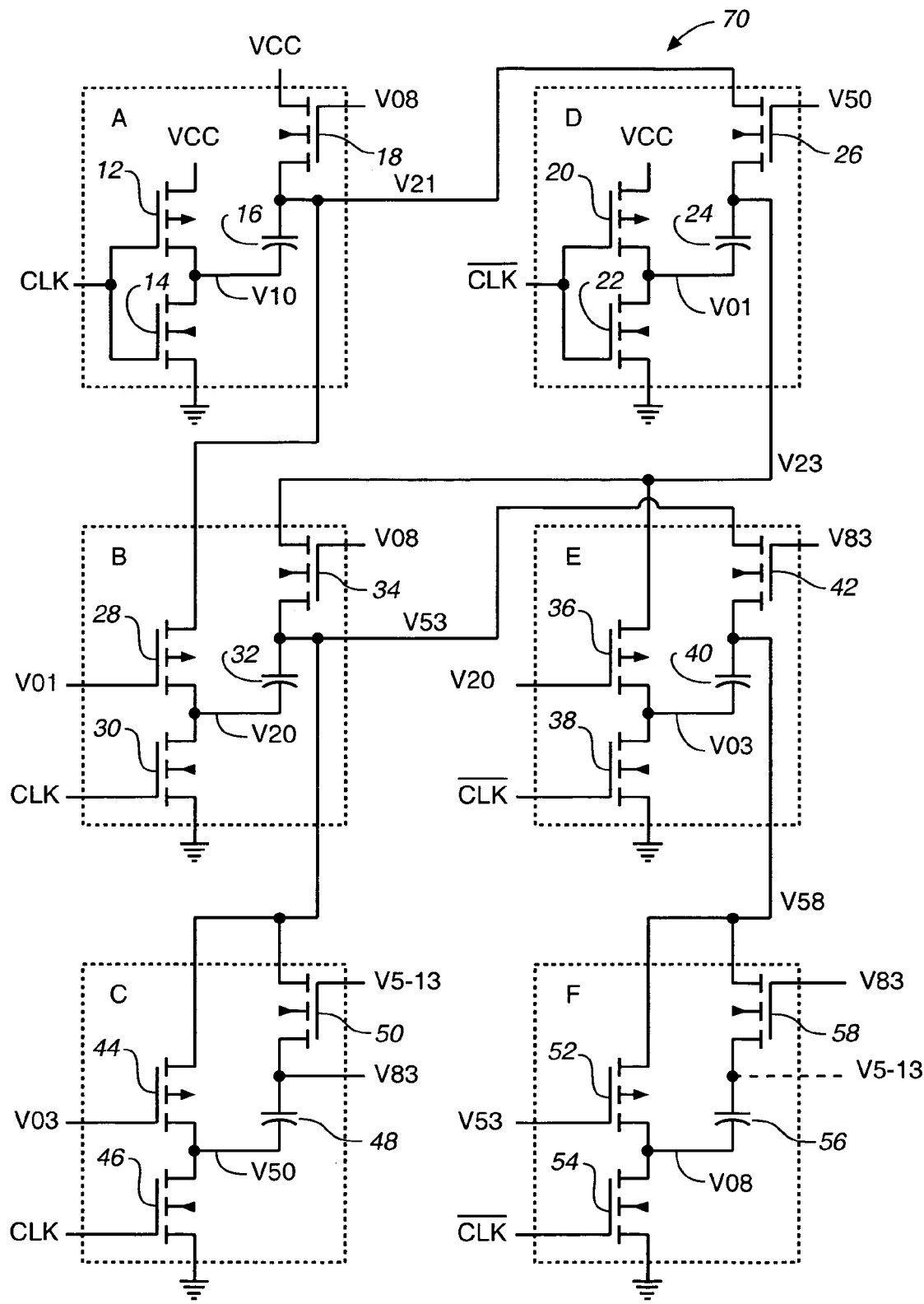
FIG._4

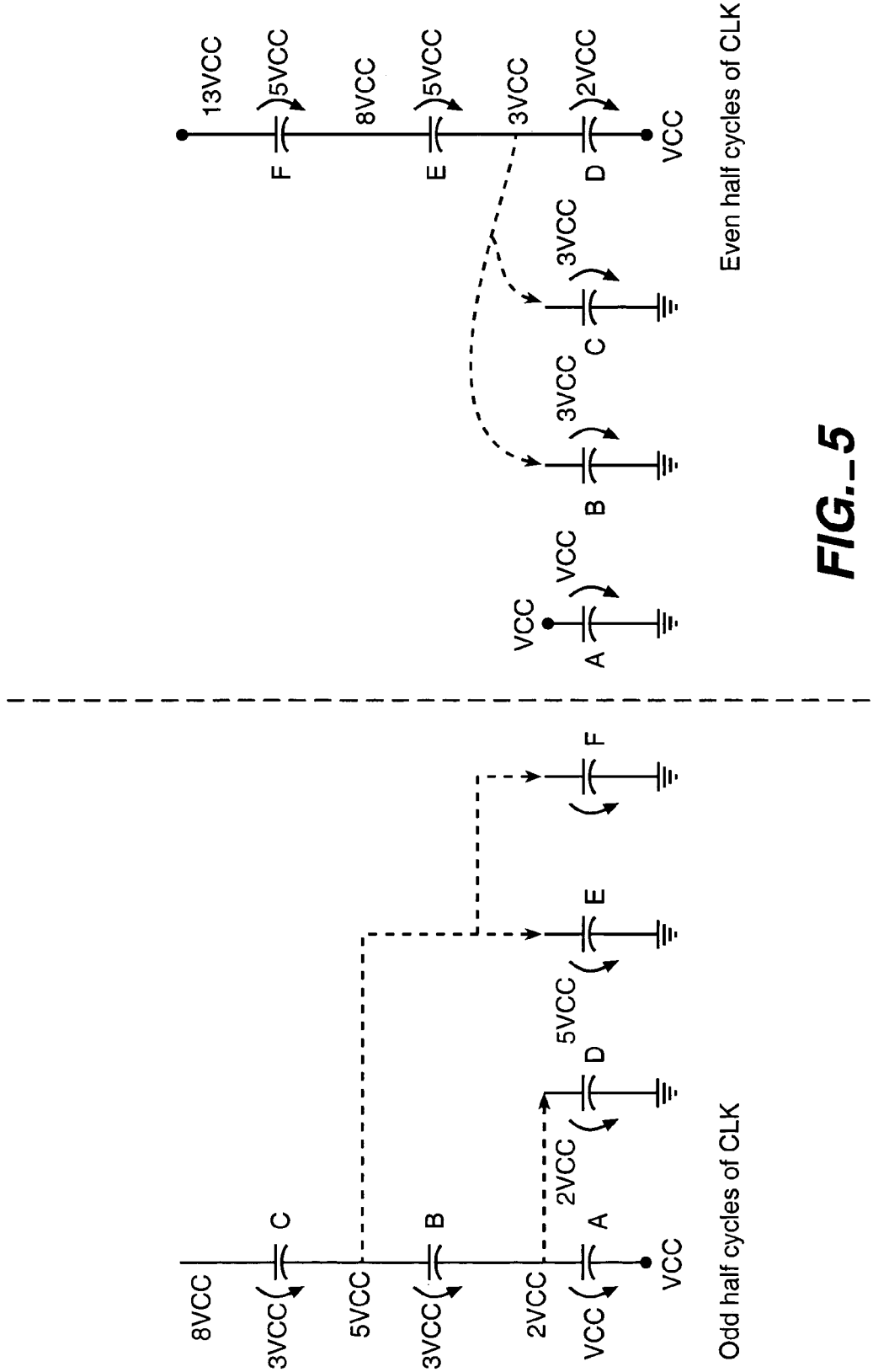
FIG._5

CHARGE PUMP WITH FIBONACCI NUMBER MULTIPLICATION

CROSS-REFERENCE TO RELATED APPLICATION

This application is a continuation of application Ser. No. 10/260,115, filed Sep. 27, 2002, now U.S. Pat. No. 6,861,894, which application is incorporated herein in its entirety by this reference.

FIELD OF THE INVENTION

This invention pertains generally to the field of charge pumps and more particularly to a charge pump having stages arranged to effect voltage increases that follow a Fibonacci number sequence.

BACKGROUND

Charge pumps use a switching process to provide a DC output voltage larger than its DC input voltage. In general, a charge pump will have a capacitor coupled to switches between an input and an output. During one clock half cycle, the charging half cycle, the capacitor couples in parallel to the input so as to charge up to the input voltage. During a second clock cycle, the transfer half cycle, the charged capacitor couples in series with the input voltage so as to provide an output voltage twice the level of the input voltage. This process is illustrated in FIGS. 1a and 1b. In FIG. 1a, the capacitor 5 is arranged in parallel with the input voltage $V_{IN}$ to illustrate the charging half cycle. In FIG. 1b, the charged capacitor 5 is arranged in series with the input voltage to illustrate the transfer half cycle. As seen in FIG. 1b, the positive terminal of the charged capacitor 5 will thus be $2*V_{IN}$ with respect to ground.

The generic charge pump described above will provides an output voltage that can be no more than twice the input voltage VCC. U.S. Pat. No. 5,436,587, the contents of which are hereby incorporated by reference, discloses a charge pump having a voltage adder stage followed by a plurality of voltage doubler stages, wherein the stages are cascaded such that output voltages considerably higher than twice VCC may be obtained. While the voltage adder stage uses just one capacitor per output voltage signal, the voltage doubler stages require 2 capacitors for each output voltage signal, thereby increasing manufacturing costs. Replacing all the voltage doubler stages with voltage adder stages, however, would increase the series resistance substantially.

Accordingly, there is a need in the art for efficient charge pumps that require just one capacitor per stage.

SUMMARY OF THE INVENTION

In accordance with one aspect of the invention, a charge pump includes a plurality of voltage stages, wherein each voltage stage includes a capacitor. During operation, the charge pump charges the capacitors and serially couples the capacitors such that the charged capacitor in a first voltage stage has its positive terminal coupled to a negative terminal of the charged capacitor in a second voltage stage, and so on. The charge pump charges the capacitors such that, for an integer k greater than one, the voltage across the capacitor in the kth voltage stage is substantially equal to the voltage at its negative terminal plus the voltage across the capacitor in the (k−1)th voltage stage.

In accordance with another aspect of the invention, a method of generating voltages includes an act of alternately charging a plurality of capacitors and then serially coupling the plurality of charged capacitors. The charged capacitors are serially coupled such that a positive terminal of a first capacitor in the plurality couples to a negative terminal of a second capacitor in the plurality, and so on. The capacitors are charged such that, for an integer k greater than one, the voltage across the capacitor is substantially equal to the voltage at its negative terminal plus the voltage across the (k−1)th capacitor.

The following description and figures disclose other aspects and advantages of the present invention.

BRIEF DESCRIPTION OF THE DRAWINGS

The various aspects and features of the present invention may be better understood by examining the following figures, in which:

FIG. 1a is a simplified circuit diagram of the charging half cycle in a generic charge pump.

FIG. 1b is a simplified circuit diagram of the transfer half cycle in a generic charge pump.

FIG. 2 is a circuit diagram of a charge pump having voltage increases arranged with respect to a Fibonacci number multiplication according to one embodiment of the invention.

FIG. 3 is a simplified circuit diagram illustrating the serial coupling half cycles for the capacitors in the charge pump of FIG. 2.

FIG. 4 is a modification of the charge pump of FIG. 2 such that no diode drop occurs in the charging of the final voltage stage.

FIG. 5 is a simplified circuit diagram illustrating the serial coupling half cycles for the capacitors in the charge pump of FIG. 4.

DETAILED DESCRIPTION

The present invention provides a charge pump which may use one capacitor per stage. Each stage multiplies the power supply voltage by an integer number such that the voltage signals produced by each stage and the integer increases may follow a portion of a Fibonacci number series. In a Fibonacci series, the kth number (with the exception of the first and second numbers which both equal one) in the series will equal the sum of the (k−1)th and (k−2)th numbers. Thus, a Fibonacci series is as follows: 1, 1, 2, 3, 5, 8, 13, 21, etc.

Turning now to FIG. 2, an example charge pump 10 having six stages A through F is shown. The stages may be organized according to which clock signal they receive. Stages A through C receive a clock signal CLK whereas stages D through F receive a complementary clock signal CLKBAR. Both clock signals may oscillate between ground (LOW) and the input supply voltage VCC (HIGH). Alternatively, the HIGH state of the clock signal may be different from VCC. What is important is that the amplitude of this HIGH state be sufficient to switch on the transistors it controls. Without loss of generality, the CLK signal may be assumed to begin with a first clock half cycle that is LOW, followed by a second clock half cycle that is HIGH, and then a third clock half cycle that is LOW, and so on. Thus, during odd numbered clock half cycles, the CLK signal is LOW and during even numbered clock half cycles, the CLK signal is HIGH. Similarly, the CLKBAR signal will be HIGH during odd numbered clock half cycles and LOW during even numbered clock half cycles.

The structure for each stage may be the same. For example, within stage A, the source of a p-mos FET 12 and the drain of an n-mos FET 14 couple to the negative terminal of a capacitor 16. The positive terminal of capacitor 16 couples to the source of an n-mos FET 18. In stage D, the source of a p-mos FET 20 and the drain of an n-mos FET 22 couple to the negative terminal of a capacitor 24. The positive terminal of capacitor 24 couples to the source of an n-mos FET 26. In stage B, the source of a p-mos FET 28 and the drain of an n-mos FET 30 couple to the negative terminal of a capacitor 32. The positive terminal of capacitor 32 couples to the source of an n-mos FET 34. In stage E, the source of a p-mos FET 36 and the drain of an n-mos FET 38 couple to the negative terminal of a capacitor 40. The positive terminal of capacitor 40 couples to the source of an n-mos FET 42. In stage C, the source of a p-mos FET 44 and the drain of an n-mos FET 46 couple to the negative terminal of a capacitor 48. The positive terminal of capacitor 48 couples to the source of an n-mos FET 50. Finally, in stage F, the source of a p-mos FET 52 and the drain of an n-mos FET 54 couple to the negative terminal of a capacitor 56. The positive terminal of capacitor 56 couples to the source of an n-mos FET 58.

The capacitors 16, 32, and 48 within stages A through C will serially couple on odd half cycles of the CLK signal. During this time, voltages from the serially coupled capacitors are used to charge the capacitors 24, 40, and 56 within stages E through F. Similarly, the capacitors 24, 40, and 56 within stages D through F will serially couple on even half cycles of the CLK signal. During these even half cycles, voltages from the serially coupled capacitors are used to charge the capacitors 16, 32, and 48 within stages A through C.

FIG. 3 illustrates the serial coupling and charging half cycles. For clarity, just the capacitors within each voltage stage are shown, identified by the corresponding letter A through F. During even half cycles of the CLK signal, the capacitors in stages A through C are charged to VCC, 3*VCC, and 8*VCC volts, respectively. During odd half cycles of the CLK signal, these charged capacitors are serially coupled and the negative terminal of the capacitor in voltage stage A is charged to VCC. As a result, the voltages at the positive terminals of the capacitors in stages A through C will be 2*VCC, 5*VCC, and 13*VCC volts, respectively. During this odd half cycle, these same voltages are used to charge the capacitors in stages D through F. Thus, the capacitor in stage D will be charged to 2*VCC, the capacitor in stage E will be charged to 5*VCC, and the capacitor in stage F will be charged to 13*VCC volts (minus a diode drop as explained below).

Similarly, during an even half cycle of the CLK signal, the charged capacitors in stages D through F are serially coupled. The negative terminal of the charged capacitor in stage D is charged to VCC volts. As a result, the voltages at the positive terminals of the capacitors in stages D through F will be 3*VCC, 8*VCC, and 21*VCC volts, respectively. These voltages are then used to charge the remaining stages as follows. Stage A is the "starting" stage so it does not receive a charging voltage from stages D through F, instead being charged to VCC volts. However, the voltage from stage D charges the capacitor in stage B to 3*VCC volts, and the voltage from stage E charges the capacitor in stage C to 8*VCC volts.

Note the pattern followed by the voltages thus produced when the stages are serially coupled. For clarity, the VCC term will be ignored such that VCC is denoted as 1, 2*VCC as 2, and so on. Starting from the negative end of the capacitor for stage A, this node is 1. The voltage across the capacitor in stage A gives another 1. The voltage at the positive terminal of the capacitor in stage A provides a 2. Continuing to note, in series for each capacitor, the voltage at the negative end of the capacitor, the voltage across the capacitor, and the voltage at the positive end of the capacitor, the following pattern emerges for stages A through C: 1, 1, 2, 3, 5, 8, and 13. This series forms a portion of a Fibonacci series as discussed above. The voltages observed for stages D through F are similar: 1, 2, 3, 5, 8, 13, and 21. This series also forms a portion, starting from the second "one," of a Fibonacci series.

These voltages are produced in the following manner. Referring back to FIG. 2, during odd half cycles of the CLK signal (when this signal is LOW) for stage A, n-mos transistor 14 will be OFF and p-mos transistor 12 will be ON. Thus the negative terminal of capacitor 16 will be charged to VCC. Assuming that capacitor 16 had previously been charged to VCC, a voltage signal V21 at the positive terminal of capacitor 16 will be substantially equal to 2*VCC. Voltage signal V21 is so denoted because it equals 2*VCC on odd half cycles of the CLK signal and 1*VCC on even half cycles of the CLK signal. Similar signals will also follow the same nomenclature such that the first number equals the multiples of VCC on odd half cycles of the CLK signal and the second number equals the multiples on even half cycles. Although capacitor 16 had been charged to VCC, it will be appreciated by those of ordinary skill in the art, that charge will be lost by charge sharing, capacitive coupling, and/or leakage and other related processes. Thus, as used herein, "substantially equal" to a given voltage level will be understood to include any such losses. In stage D, the complementary clock signal CLKBAR will be HIGH during odd half cycles of the CLK signal, thereby switching ON n-mos FET 22 and switching OFF p-mos FET 20. Thus, the voltage signal V01 at the negative terminal of capacitor 24 will be pulled towards ground. Similarly, voltage signals V03 and V08 in stages E and F will also be grounded.

In turn, voltage signal V01 controls the gate of p-mos transistor 28 in stage B, thereby switching ON this transistor and pulling signal V20 at the negative terminal of capacitor 32 to a voltage of 2*VCC. Assuming that capacitor 32 had previously been charged to 3*VCC, voltage signal V53 at the positive terminal of capacitor 32 will be substantially equal to 5*VCC. In stage C, voltage signal V03, being LOW, will switch ON p-mos FET 44, allowing voltage signal V53 to charge voltage signal V50 at the negative terminal of capacitor 48 to 5*VCC, given that n-mos FET 46 has been switched OFF from the LOW state of the CLK signal. Assuming that capacitor 48 has been charged to 8*VCC, voltage signal V13-8 at the positive terminal of capacitor 48 will be substantially equal to 13*VCC. In this fashion, capacitors 16, 32, and 48 in stages A, B, and C, respectively, are serially coupled during odd half cycles of the CLK signal.

As discussed with respect to FIG. 3, voltages from these serially coupled capacitors are used to charge the capacitors in the remaining stages during odd half cycles of the CLK signal. For example, in stage D, n-mos FET 26 receives voltage signal V21 at its drain. Because this FET receive voltage signal V50 at its gate, it will be switched on, charging capacitor 24 to 2*VCC with respect to its grounded negative terminal. In turn, voltage signal V23 will also be charged to 2*VCC. Similarly, in stage E, because n-mos FET receives voltage signal V13-8 at its gate, it will be switched ON, allowing voltage signal V53 to charge capacitor 40 to 5*VCC with respect to its grounded negative terminal. In turn, voltage signal V58 will also be charged to 5*VCC. Finally, in stage F, diode-connected n-mos FET 58 will be switched on by voltage signal V13-8, permitting this voltage signal to charge capacitor 56 to 13*VCC (minus the diode drop) with respect to its grounded negative terminal. In turn, voltage signal V13-21 will be charged to 13*VCC as well.

In an analogous fashion, during even half cycles of the CLK signal, capacitors 24, 40, and 56 in stages D, E, and F, respectively, will also be serially coupled. During these even half cycles, the CLKBAR signal will be LOW, thereby switching OFF n-mos FETs 22, 38, and 54 and preventing the corresponding negative terminals of the serially-coupled capacitors from being grounded. At the same time, because of the HIGH state for the CLK signal, n-mos FETs 14, 30, and 46 in stages A, B, and C, respectively, will be switched ON, thereby pulling signals V10, V20, and V50 at the corresponding negative terminals of capacitors 16, 32, and 48 to ground. In stage D, p-mos FET 20 will be switched ON, permitting supply voltage VCC to charge signal V01 at the negative terminal of capacitor 24 to VCC. Because capacitor 24 had been charged to 2*VCC, voltage signal V23 at the positive terminal of capacitor 24 will be substantially equal to 3*VCC at this time. Because of the LOW state for signal V50 controlling its gate, transistor 26 will be switched OFF, preventing voltage signal V23 from discharging back through this transistor. In turn, voltage signal V23 couples to the source of p-mos FET 36 in stage E. Because this transistor receives voltage signal V20, which is LOW at this time, at its gate, p-mos FET 36 will be switched ON, charging signal V03 at the negative terminal of capacitor 40 to 3*VCC. Given that capacitor 40 has been charged already to 5*VCC, voltage signal V58 at the positive terminal of capacitor 40 will be substantially equal to 8*VCC. Voltage signal V58 will not discharge back through n-mos FET 42 because it is switched OFF by the 8*VCC voltage of voltage signal V13-8. In turn, voltage signal V58 couples to the source of p-mos FET 52 in stage F. Because this transistor receives the LOW state of voltage signal V53 at its gate, it will be switched ON, thereby charging voltage signal V08 at the negative terminal of capacitor 56 to 8*VCC. Because capacitor 56 has been charged to 13*VCC (minus the diode drop at transistor 58), voltage signal V13-21 at the positive terminal of capacitor 56 will be substantially equal to 21*VCC. Given that the source of diode-connected transistor 58 will be at a higher potential than its drain, it will be switched OFF, preventing voltage signal V13-21 from discharging back through this transistor.

As discussed with respect to FIG. 3, voltages from the serially coupled capacitors in stages D and E are used to charge the capacitors in stages B and C during even half cycles of the CLK signal. Stage A, being the starting stage, charges its capacitor 16 using the supply voltage VCC at this time as follows. The 8*VCC potential of voltage signal V08 couples to the gate of n-mos transistor 18, thereby switching it ON and bringing voltage signal V21 to VCC and charging capacitor 16 to VCC with respect to its grounded terminal. Similarly, voltage signal V08 will also switch ON n-mos FET 34 in stage B, permitting voltage signal V23 to charge capacitor 32 to 3*VCC with respect to its grounded terminal and bringing voltage signal V53 to 3*VCC as well. Finally, voltage signal V13-21 switches ON n-mos FET 50 in stage C, permitting voltage signal V58 to charge capacitor 48 to 8*VCC and bringing voltage signal V13-8 to 8*VCC as well. Note that during both even and odd clock half cycles, all the gate signals for p-mos FETs 28, 36, 44, and 52 and n-mos FETs 18, 26, 34, 42, and 50 are all self-generated. However, n-mos FET 58 in stage F presents a problem. Here, capacitor 56 will be charged to 13*VCC during odd half cycles of the CLK signal. Thus, to keep n-mos FET 58 switched ON during this charging process requires a gate voltage of 13*VCC plus the threshold voltage. But at this time, a voltage of 13*VCC is the highest available from charge pump 10. Thus, one solution is to diode connect this transistor as illustrated. Alternatively, an additional output stage (not illustrated) may be implemented to provide a gating voltage at 13*VCC plus (at least) the threshold voltage. For example, U.S. Pat. No. 5,436,587 discloses an output stage that could be modified to receive voltage signal V13-21 and provide a suitable gating voltage. Although such an embodiment would require additional components, it would not suffer the diode drop experienced by voltage signal V13-21 of FIG. 2.

From an examination of FIGS. 2 and 3, a generalization may be made to construct a charge pump having an arbitrary number N of serially-coupled capacitors during any one-half clock cycle. In such a charge pump, a first plurality of N stages would include a first stage, a second stage, and so on, each stage including a capacitor. A second plurality of N stages begins with a (N+1)th stage, followed by an (N+2)th stage, and so on, each stage also including a capacitor. During odd half cycles of a clock signal, the positive terminal of the capacitor in the first stage couples to the negative terminal of the capacitor in the second stage, and so on. During even half cycles of the clock signal, the positive terminal of the capacitor in the (N+1)th stage couples to the negative terminal of the capacitor in the (N+2)th stage, and so on. With respect to the second stage and higher in the first plurality and the (N+2)th stage and higher in the second plurality, the voltage across any given capacitor in a stage substantially equals the voltage at the given capacitor's negative terminal and the voltage across the capacitor in the preceding stage. During the odd half cycles, the voltages at positive terminals of the capacitors in the first plurality of stages are used to charge the corresponding capacitors in the second plurality of stages. In other words, the voltage at the positive terminal of the capacitor in the first stage charges the capacitor in (N+1)th stage, the voltage at the positive terminal of the capacitor in the second stage charges the capacitor in the (N+2)th stage, and so on. During even half cycles, the voltage at the positive terminal of the capacitor in the (N+1)th stage charges the capacitor in the second stage, and so on, such that the voltage at the positive terminal of the capacitor in the (2*N−1) stage charges the capacitor in the Nth stage.

As discussed above with respect to charge pump 10 of FIG. 2, to provide the proper gating voltage, the final stage in such an arrangement may require either a diode-connected transistor, which introduces a diode drop in the produced voltage, or an output stage, which requires extra components. To avoid either alternative, the Nth stage in the first plurality and the 2*Nth stage in the second plurality may be modified such that each modified stage provides gating voltages for the other stages. In such an embodiment, the 2*Nth stage will not introduce a diode drop or require an additional output stage.

Turning now to FIG. 4, a charge pump 70 illustrates this modification. Stages A through F may have the same components as discussed with respect to FIG. 2. Here, the capacitors in stages A through F will serially couple as before in that during odd half cycles of the CLK signal, capacitors A through C serially couple, and voltages from the serially-coupled capacitors are used to charge the remaining capacitors. Similarly, capacitors D through F serially couple during even half cycles of the CLK signal and voltages from these serially-coupled capacitors are used to charge the remaining capacitors. However, the capacitors in stages C and F are not charged as discussed above.

To illustrate the difference, FIG. 5 shows the serial coupling and charging half cycles for the charge pump 70 of FIG. 4. For clarity, just the capacitors within each voltage stage are shown, identified by the corresponding letter A through F. During even half cycles of the CLK signal, the capacitors in stages A through C are charged to VCC, 3*VCC, and 3*VCC volts, respectively. During odd half cycles of the CLK signal, these charged capacitors are serially coupled and the negative terminal of the capacitor in voltage stage A is charged to VCC. As a result, the voltages at the positive terminals of the capacitors in stages A through C will be 2*VCC, 5*VCC, and 8*VCC volts, respectively. During this odd half cycle, these same voltages are used to charge the capacitors in stages D through F. However, the 8*VCC voltage at the positive terminal of the capacitor in stage C is not used. Instead, the 5*VCC voltage at the positive terminal of the capacitor in stage B is used twice. Thus, the capacitor in stage D will be charged to 2*VCC, the capacitor in stage E will be charged to 5*VCC, and the capacitor in stage F will be charged to 5*VCC volts.

Similarly, during an even half cycle of the CLK signal, the charged capacitors in stages D through F are serially coupled. The negative terminal of the charged capacitor in stage D is charged to VCC volts. As a result, the voltages at the positive terminals of the capacitors in stages D through F will be 3*VCC, 8*VCC, and 13*VCC volts, respectively. These voltages are then used to charge the remaining stages as follows. Stage A is the "starting" stage so it does not receive a charging voltage from stages D through F, instead being charged to VCC volts. However, the voltage from stage D charges the capacitor in stages B and C to 3*VCC volts, respectively. The voltage from the final stage F is not used for charging, just as the voltage from stage C was not used in the previous half cycle.

Note the pattern followed by the voltages thus produced when the stages are serially coupled. As discussed with respect to FIG. 3, the VCC term will be ignored such that VCC is denoted as 1, 2*VCC as 2, and so on. Starting from the negative end of the capacitor for stage A, this node is 1. The voltage across the capacitor in stage A gives another 1. The voltage at the positive terminal of the capacitor in stage A provides a 2. Continuing to note, in series for each capacitor, the voltage at the negative end of the capacitor, the voltage across the capacitor, and the voltage at the positive end of the capacitor, the following pattern emerges for stages A through B: 1, 1, 2, 3, 5. This series forms a portion of a Fibonacci series as discussed above. The voltages observed for stages D through E are similar: 1, 2, 3, 5, 8. This series also forms a portion, starting from the second "one," of a Fibonacci series. Because the final stages C and F are modified with respect to their representations in FIG. 2, the voltages from these stages do not continue the Fibonacci series in either case.

Referring back to FIG. 4, the charging of the capacitors 16, 24, and 32 in stages A, D, and B, respectively, occurs as discussed with respect to FIG. 2. During odd half cycles of the CLK signal, voltage signal V53 from stage B will couple to the negative terminal of capacitor 40 in stage D. Assuming that capacitor 48 has been charged to 5*VCC with respect to its negative terminal, voltage signal V83 at the positive terminal of capacitor 48 will be substantially equal to 8*VCC at this time. Because voltage signal V83 couples to the gate of n-mos FET 42, thereby switching it ON, voltage signal V53 from stage B may charge capacitor 40 to 5*VCC with respect to its grounded negative terminal. In turn, voltage signal V58 at the positive terminal of capacitor 40 will also equal 5*VCC. From stage E, voltage signal V58 is used to charge capacitor 56 in stage F, coupling through n-mos FET 58 which is switched ON by the 8*VCC voltage of voltage signal V83. Note that no diode-connected transistor is necessary, thereby obviating any diode drop in the charging voltage for capacitor 56. At this time, the negative terminal of capacitor 56 is pulled to ground through the switched ON n-mos FET 54.

During even half cycles of the CLK signal, voltage signal V23 at the positive terminal of capacitor 24 in stage D will be substantially equal to 3*VCC. This voltage signal charges both capacitor 32 in stage B and capacitor 48 in stage C. Voltage signal 58 will be substantially equal to 8*VCC and will couple to the negative terminal of charged capacitor 56 in stage F. Thus, voltage signal V5-13 will be substantially equal to 13*VCC at this time.

From an examination of FIGS. 4 and 5, a generalization may be made to construct charge pump having an arbitrary number N of serially-coupled capacitors during any one-half clock cycle, wherein the voltage from the Nth capacitor is not used to charge other capacitors. In such a charge pump, a first plurality of N stages would include a first stage, a second stage, and so on, each stage including a capacitor. A second plurality of N stages begins with a (N+1)th stage, followed by an (N+2)th stage, and so on, each stage also including a capacitor. During odd half cycles of a clock signal, the positive terminal of the capacitor in the first stage couples to the negative terminal of the capacitor in the second stage, and so on. During even half cycles of the clock signal, the positive terminal of the capacitor in the (N+1)th stage couples to the negative terminal of the capacitor in the (N+2)th stage, and so on. During the odd half cycles, the voltages at positive terminals of the capacitors in the first plurality of stages are used to charge the corresponding capacitors in the second plurality of stages. In other words, the voltage at the positive terminal of the capacitor in the first stage charges the capacitor in (N+1)th stage, the voltage at the positive terminal of the capacitor in the second stage charges the capacitor in the (N+2)th stage, and so on, until the voltage at the positive terminal of the capacitor in the (N−1)th stage charges the capacitor in the (2*N−1)th voltage stage. Here, the pattern breaks such that the capacitor in the (2*N)th voltage stage also receives its charging voltage from the positive terminal of the capacitor in the (N−1)th voltage stage (rather than the Nth voltage stage).

During even half cycles, the first voltage stage charges from the supply voltage VCC, the voltage at the positive terminal of the capacitor in the (N+1)th stage charges the capacitor in the second stage, the voltage at the positive terminal of the capacitor in the (N+2)th stage charges the capacitor in the third stage and so on, until the voltage at the positive terminal of the capacitor in the (2*N−2)th voltage stage charges the capacitor in the (N−1)th voltage stage. Here, the pattern breaks such that the capacitor in the Nth voltage stage also receives its charging voltage from the positive terminal of the capacitor in the (2*N−2)th voltage stage (rather than the (2*N−1)th stage). In such an arrangement, the various voltage stages may have the structure as shown in FIG. 4 such that the 2*Nth voltage stage may have an n-mos FET at the positive terminal of its capacitor (analogous to n-mos FET 58). No matter the number of voltage stages, the voltage at the positive terminal of the capacitor in the Nth voltage stage will always be high enough to switch on this n-mos FET such that the capacitor in the 2*Nth voltage stage may charge. In this manner, the diode-connected transistor 58 of FIG. 2 is obviated.

Although the invention has been described with reference to particular embodiments, the description is only an example of the invention's application and should not be taken as a limitation. Consequently, various adaptations and combinations of features of the embodiments disclosed are within the scope of the invention as encompassed by the following claims.

The invention claimed is:

1. A method of generating voltages, comprising in order:
    (a) charging a first plurality of capacitors,
    (b) serially coupling a first plurality of charged capacitors such that, within the first plurality of charged capacitors, a positive terminal of a charged first capacitor couples to a negative terminal of a charged second capacitor and so on,
    (c) charging a second plurality of capacitors from voltages produced by the first plurality of serially-coupled charged capacitors,
    (d) serially coupling the second plurality of charged capacitors such that, within the second plurality of capacitors, a positive terminal of a charged first capacitor couples to a negative terminal of a charged second capacitor and so on,
    (e) charging the first plurality of capacitors from voltages produced by the second plurality of serially-coupled charged capacitors, and
    (f) repeating (b)–(e) in order a multiple number of times.

2. The method of claim 1, wherein (b) and (c) occur during a first phase of a clock signal and (d) and (e) occur during a second phase of the clock signal.

3. The method of claim 1, wherein, for an integer k greater than one, the voltage across the kth capacitor in the first plurality of capacitors during (b) equals the voltage at its negative terminal plus the voltage across the (k−1)th capacitor in the first plurality of capacitors.

4. The method of claim 3, wherein, for an integer m greater than 1, the voltage across the mth capacitor in the second plurality of capacitors during (d) equals the voltage at its negative terminal plus the voltage across the (m−1)th capacitor in the second plurality of capacitors.

5. The method of claim 4, wherein (b) and (c) occur during a first phase of a clock signal and (d) and (e) occur during a second phase of the clock signal.

* * * * *

UNITED STATES PATENT AND TRADEMARK OFFICE
CERTIFICATE OF CORRECTION

| | | |
|---|---|---|
| PATENT NO. | : 7,135,910 B2 | Page 1 of 1 |
| APPLICATION NO. | : 11/069660 | |
| DATED | : November 14, 2006 | |
| INVENTOR(S) | : Raul-Adrian Cernea | |

It is certified that error appears in the above-identified patent and that said Letters Patent is hereby corrected as shown below:

Column 9, line 20, claim 1; after "negative", delete "tenninal" and insert --terminal--.

Signed and Sealed this

Sixth Day of March, 2007

JON W. DUDAS
*Director of the United States Patent and Trademark Office*